United States Patent
Xiao et al.

(10) Patent No.: US 10,115,176 B2
(45) Date of Patent: Oct. 30, 2018

(54) METHODS FOR CHECKING DEPENDENCIES OF DATA UNITS AND APPARATUSES USING THE SAME

(71) Applicant: VIA Alliance Semiconductor Co., Ltd., Shanghai (CN)

(72) Inventors: Heng Xiao, Shanghai (CN); Ying Liang, Shanghai (CN); Heng Que, Shanghai (CN)

(73) Assignee: VIA Alliance Semiconductor Co., Ltd., Shanghai (CN)

( * ) Notice: Subject to any disclaimer, the term of this patent is extended or adjusted under 35 U.S.C. 154(b) by 113 days.

(21) Appl. No.: 15/141,750

(22) Filed: Apr. 28, 2016

(65) Prior Publication Data
US 2017/0140496 A1 May 18, 2017

(30) Foreign Application Priority Data
Nov. 17, 2015 (CN) .......................... 2015 1 0788209

(51) Int. Cl.
*G06T 1/20* (2006.01)
*G06F 3/06* (2006.01)
*G06T 15/00* (2011.01)

(52) U.S. Cl.
CPC .............. *G06T 1/20* (2013.01); *G06F 3/0604* (2013.01); *G06F 3/0659* (2013.01); *G06F 3/0673* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 2003/0123468 A1* | 7/2003 | Nong | H04L 12/5601 370/412 |
| 2004/0093602 A1 | 5/2004 | Huston et al. | |
| 2010/0162092 A1* | 6/2010 | Albu | G06T 15/04 715/202 |
| 2014/0026002 A1* | 1/2014 | Haines | G06F 11/0766 714/57 |
| 2015/0161758 A1* | 6/2015 | Ashbaugh | G06F 12/00 345/538 |
| 2015/0286597 A1* | 10/2015 | Vajapeyam | G06F 13/28 710/308 |

FOREIGN PATENT DOCUMENTS

CN   1652154 A   8/2005

OTHER PUBLICATIONS

Chinese language office action dated Jul. 31, 2017, issued in application No. CN 201510788209.3.

* cited by examiner

*Primary Examiner* — Yi Wang
(74) *Attorney, Agent, or Firm* — McClure, Qualey & Rodack, LLP

(57) ABSTRACT

A memory-access completion notification associated with a data unit is received from a thread of a pixel shader. A processing status associated with the data unit is obtained from a window buffer. The processing status is updated to indicate that the data unit has not been processed by any thread. The updated processing status is written into the window buffer.

16 Claims, 6 Drawing Sheets

METHODS FOR CHECKING DEPENDENCIES OF DATA UNITS AND APPARATUSES USING THE SAME

CROSS REFERENCE TO RELATED APPLICATIONS

This application claims the benefit of China Patent Application No. 201510788209.3, filed on Nov. 17, 2015, the entirety of which is incorporated by reference herein.

BACKGROUND

Technical Field

The present invention relates to 3D (three-dimensional) graphics, and in particular, it relates to methods for checking dependencies of data units and apparatuses using the same.

Description of the Related Art

In a 3D graphics pipeline, the rasterizer converts primitives into pixels and feeds these pixels into the pixel shader. The pixel shader determines the final pixel color to be written to the render target. The rasterizer generates primitives in order and tiles for each primitive. The data units (e.g. quads) are abstracted and packed to threads. One thread contains a predefined number of data units. The threads are kicked off into the pixel shader and run in parallel. The threads run in the pixel shader may be out of order. But, the pixel shader needs to output data units in the order generated by the rasterizer. The threads, when being executed, may be arbitrary access memory, such as read data, write data, etc. However, a read-after-write hazard may occur for the same data unit between threads. To avoid the aforementioned problem, it is desirable to provide methods for checking dependencies of data units and apparatuses using the same.

BRIEF SUMMARY

An embodiment of a method for checking dependencies of data units contains at least the following steps. A memory-access completion notification associated with a data unit is received from a thread of a pixel shader. A processing status associated with the data unit is obtained from a window buffer. The processing status is updated to indicate that the data unit is not being processed by any thread. The updated processing status is written into the window buffer.

An embodiment of an apparatus for checking dependencies of data units is introduced, and it contains at least a window buffer and a window releaser. The window releaser, coupled to the window buffer, receives a memory-access completion notification associated with a data unit from a thread of a pixel shader; obtains a processing status associated with the data unit from the window buffer; updates the processing status to indicate that the data unit is not being processed by any thread; and writes the updated processing status into the window buffer.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, it should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
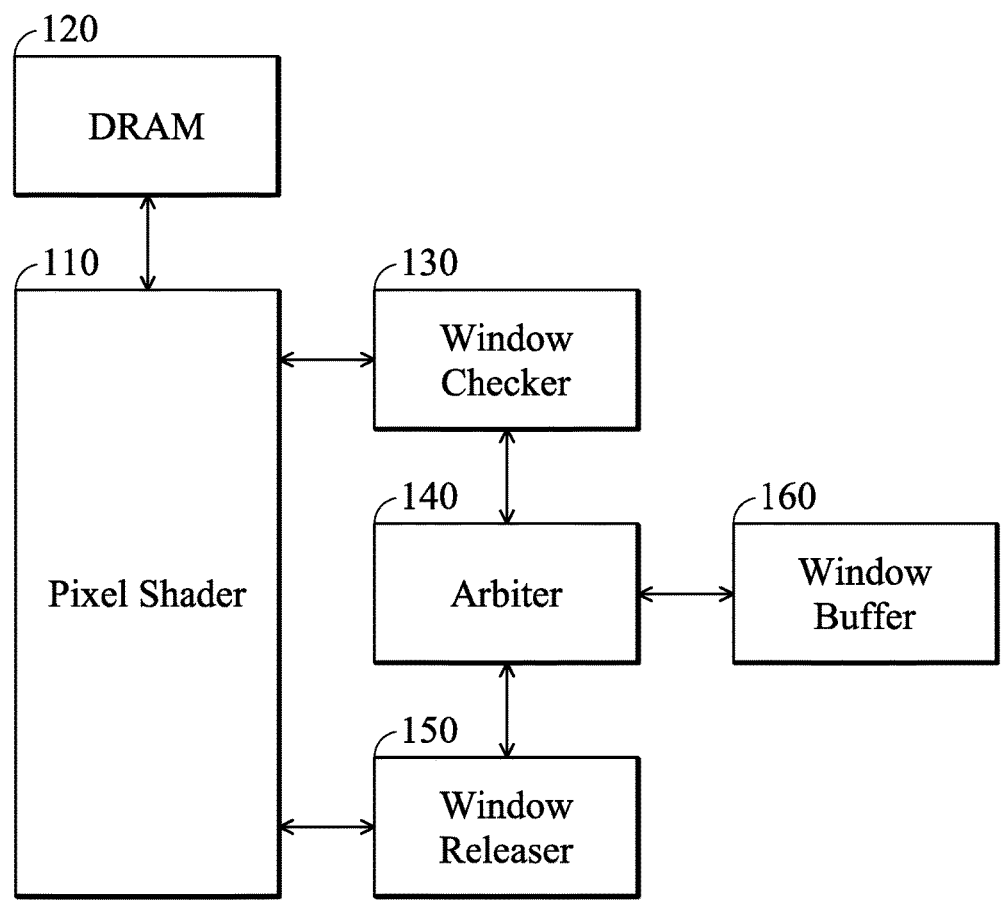
FIG. 1 is the hardware architecture of an apparatus for checking dependencies of data units according to an embodiment of the invention.
Figure 2:
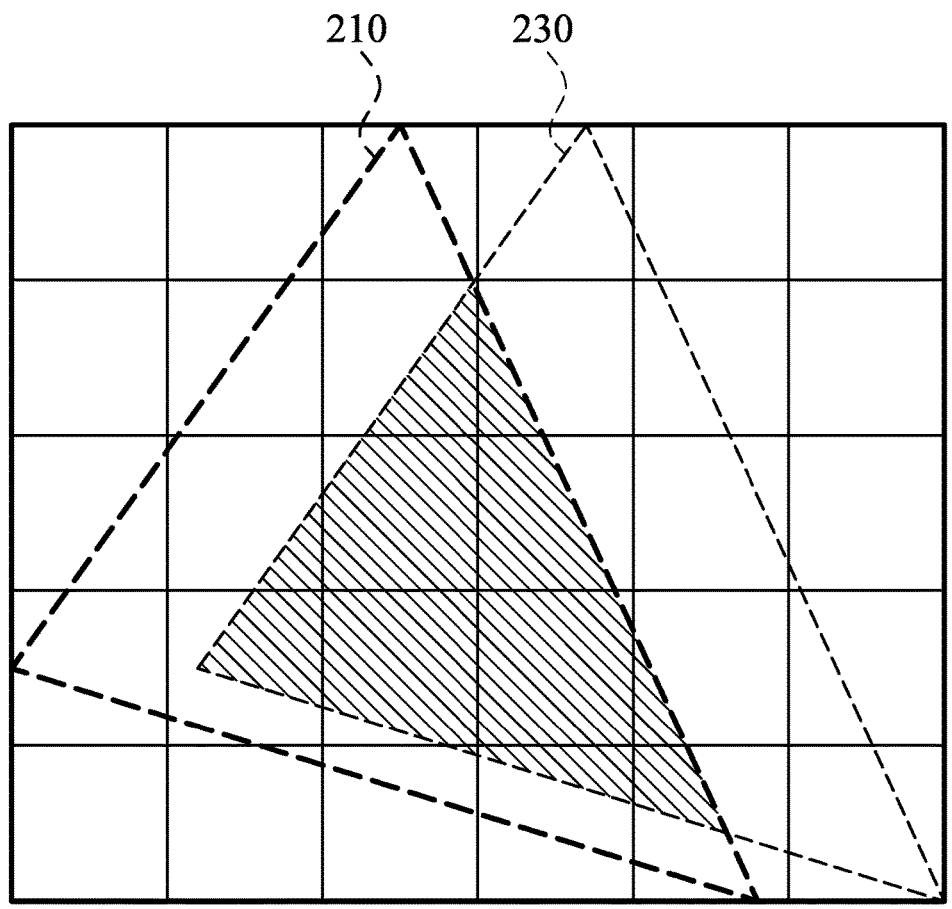
FIG. 2 is a schematic diagram illustrating primitive conversions into a 2D image according to an embodiment of the invention.

FIG. 1 is the hardware architecture of an apparatus for checking dependencies of data units according to an embodiment of the invention. A DRAM (Dynamic Random Access Memory) 120 stores attribute values associated with pixels of a 2D (two-dimensional) image, such as coordinates, z-values, color values, etc. A pixel shader 110 needs to access the attribute values of the pixels of the DRAM 120 when performing particular operations, such as ROVs (Raster Ordered Views), pixel-value fusions between primitives. One operation typically includes tasks for reading attribute values from particular addresses of the DRAM 120, computing with the read values and writing the computation results back into the DRAM 120. It should be noted that, when a thread of the pixel shader 110 has read attribute values of particular addresses but the computation results haven't been written back yet, the attribute values of the addresses cannot be read by the other threads. Otherwise, a read-after-write hazard occurs. FIG. 2 is a schematic diagram illustrating primitive conversions into a 2D image according to an embodiment of the invention. A raster generates primitives 210 and 230 sequentially and converts them into the 2D image in quads, where the primitives 210 and 230 are overlapped in the back-slashed area. When any pixel of the overlapped area is processed by the threads associated with the primitives 210 and 230 simultaneously, the pixel shader 110 has to guarantee that the thread associated with the primitive 230 cannot start to process the pixel unless the thread associated with the primitive 210 has processed the pixel completely.

Figure 3:
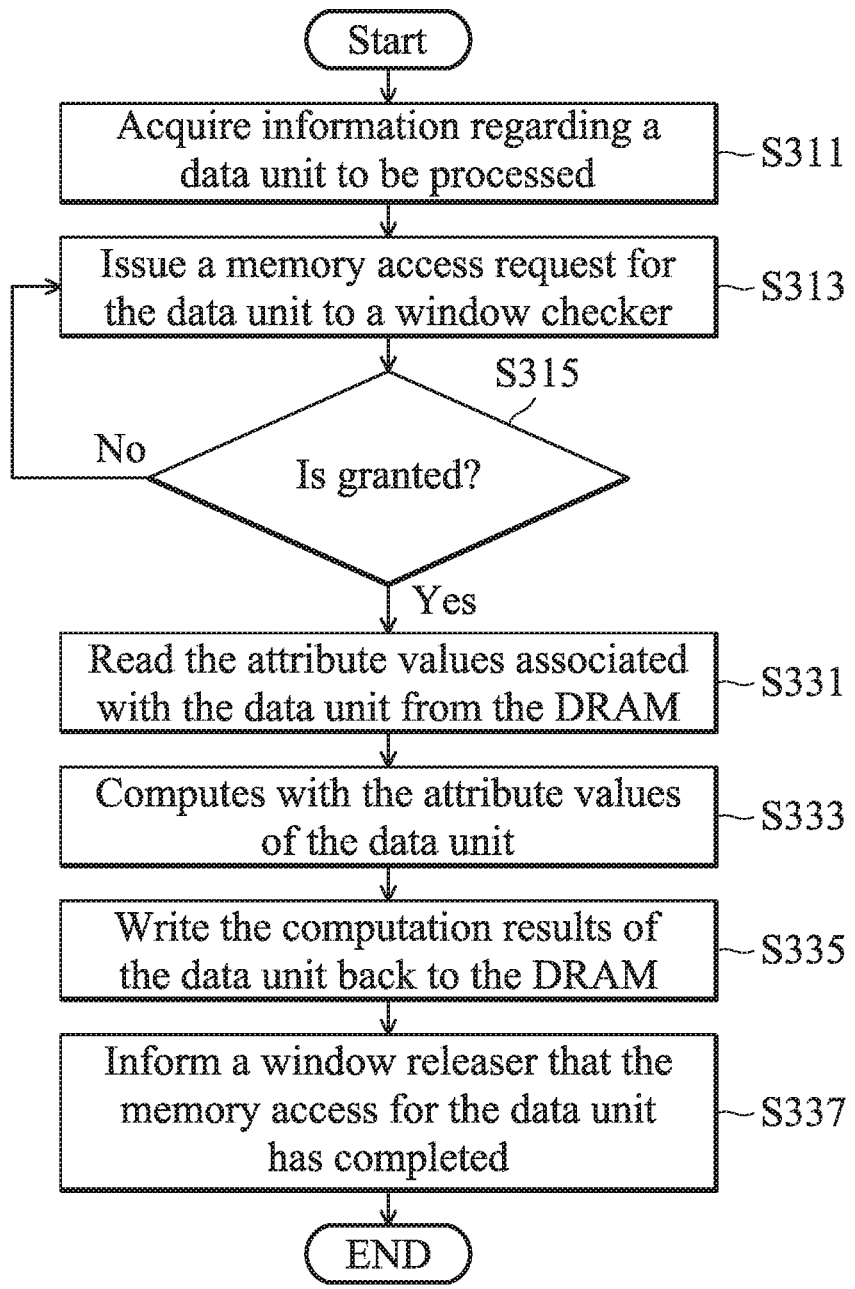
FIG. 3 is a flowchart illustrating a method for processing pixels according to an embodiment of the invention.

FIG. 3 is a flowchart illustrating a method for processing pixels according to an embodiment of the invention. The method is performed by a thread of the pixel shader 110. The process begins with an acquisition of information regarding a data unit to be processed (step S311). The data unit may be one or more pixels, quads, tiles or others. The acquired information contains at least the position at which the data unit is situated in the 2D image. The position of the 2D image may be (x,y) coordinates, a quad number, a tile number or a similar but different expression. To ensure that the access order between threads to the attribute values of the same pixel conforms to the production order of the associated primitives, a thread issues a memory access request for the data unit to a window checker 130 (step S313). The memory access request contains at least the position at which the data unit is situated in the 2D image. Next, when receiving an acknowledgement from the window checker 130 (the "Yes" path of step S315), the thread reads the attribute values associated with the data unit from the DRAM 120 (step S331). When receiving a rejection from the window checker 130 (the "No" path of step S315), the thread may re-issue a memory access request for the data unit to the window checker 130 after a predefined time period has elapsed (step S313). In some embodiments, the thread may activate a timer for counting to the predefined time period after issuing a memory access request. When receiving an acknowledgement from the window checker 130 before the timer has expired (the "Yes" path of step S315), the thread reads the attribute values associated with the data unit from the DRAM 120 (step S331). After the timer has expired (the "No" path of step S315), the thread re-issues the memory access request for the data unit to the window checker 130 (step S313). After reading the required data (step S331), the thread computes the attribute values of the data unit (step S333), writes the computation results of the data unit back to the DRAM 120 (step S335) and informs a window releaser 150 that the memory access for the data unit has completed (step S337). Detailed operations of the window checker 130 and the window releaser 150 will be discussed in the following paragraphs.

A window buffer 160 stores a processing status of each data unit and may be implemented in a 1R1W-type SRAM (Static Random Access Memory). The window buffer 160 may contain a predefined quantity M of cells and each cell may contain a predefined quantity N of bits. Each bit indicates a processing status associated with a data unit, where logic "1" indicates that the data unit is currently being processed by a thread and logic "0" indicates that the data unit is not being processed by any thread. For example, to conform to the full capability of the pixel shader 110, the window buffer 160 contains 256 cells and each cell contains 256 bits. The addressing of the processing statuses associated with the data units of the window buffer 160 conform to their positions in the 2D image. In an example, bits 0 to 255 of cell 0 indicates the processing statuses associated with the pixels at coordinates (0, 0) to (0, 255) respectively, bits 0 to 255 of cell 1 indicates the processing statuses associated with the pixels at coordinates (1, 0) to (1, 255) respectively, and so on. In another example, bits 0 to 255 of cell 0 indicates the processing statuses associated with the quads or tiles 0 to 255 respectively, bits 0 to 255 of cell 1 indicates the processing statuses associated with the quads or tiles 256 to 511 respectively, and so on. In still another example, bits 0 to 3 of cell 0 indicates the processing statuses associated with the pixels 0 to 3 of the quad 0 respectively, bits 4 to 7 of cell 0 indicates the processing statuses associated with the pixels 0 to 3 of the quad 1 respectively, and so on. Although the embodiments describe the 1R1W-type SRAM as the window buffer 160, those skilled in the art may implement the window buffer 160 in a 2R2W-type SRAM to yield better performance by the acceptable addition of a gate-count cost.

Figure 4:
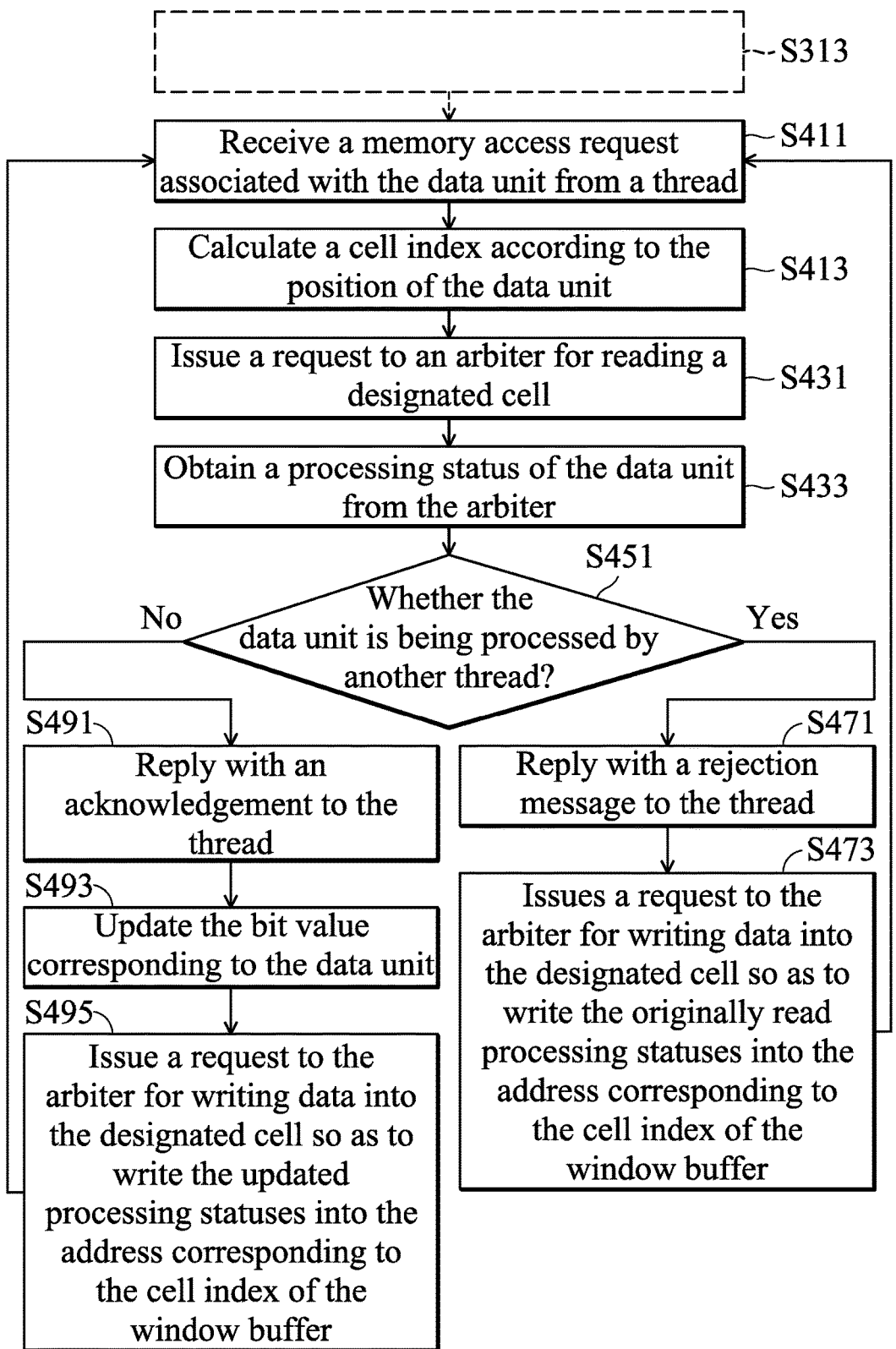
FIG. 4 is a flowchart illustrating a method for checking dependencies of data units, performed by a window checker, according to an embodiment of the invention.

FIG. 4 is a flowchart illustrating a method for checking dependencies of data units, performed by the window checker 130, according to an embodiment of the invention. The window checker 130 begins with a reception of the memory access request associated with the data unit from a thread (step S411). The memory access request contains at least the position at which the data unit is situated in the 2D image. After calculating a cell index according to the position of the data unit (step S413), the window checker 130 issues a request to an arbiter 140 for reading a designated cell (step S431) and obtains the processing status of the data unit from the arbiter 140 (step S433). The request for reading data from the designated cell, which is issued by the window checker 130, contains the calculated cell index. It should be noted that the arbiter 140 may read the whole processing statuses of the cell at one time and reply with the processing statuses to the window checker 130, and then the window checker 130 may obtain the processing status associated with the data unit from the replied data according to the position of the data unit. Assume that, for example, cell 0 stores processing statuses of quads 0 to 255 and the data unit is the quad 7: The window checker 130 may obtain the bit 7 value of the replied 256 bits from the arbiter 140 according to the position of the data unit. The window checker 130 determines whether the data unit is currently being processed by another thread (step S451). If so, a rejection procedure is performed to avoid the thread gaining access to the attribute value associated with the data unit in the DRAM 120 (steps S471 to S473). Otherwise, an acknowledgement procedure is performed to grant the thread access to the attribute value associated with the data unit in the DRAM 120 (steps S491 to S495). In step S451, for example, the corresponding bit value being logic "1" indicates that the data unit is being processed by another thread. The corresponding bit value being logic "0" indicates that the data unit is not being processed by any thread. In the rejection procedure, the window checker 130 replies with a rejection message to the thread (step S471) and issues a request to the arbiter 140 for writing data into the designated cell so as to write the originally read processing statuses into the address of the window buffer 160 corresponding to the cell index (step S473). The request for writing data into the designated cell issued by the window checker 130 contains the calculated cell index. In some embodiments, step S471 may be omitted. In the acknowledgement procedure, the window checker 130 replies with an acknowledgement to the thread (step S491), updates the bit value corresponding to the data unit to indicate that the data unit is being processed by the thread (step S493) and issues a request to the arbiter 140 for writing data into the designated cell so as to write the updated processing statuses into the address of the window buffer 160 corresponding to the cell index (step S495). In step S495, it should be noted that, except for the processing status associated with the data unit, the other processing statuses are maintained without any modification. To simplify the lock design of the arbiter 140, the read and write requests are executed pair by pair. That is, after issuing a read request for a designated cell, the window checker 130 issues a write request for the cell.

Figure 5:
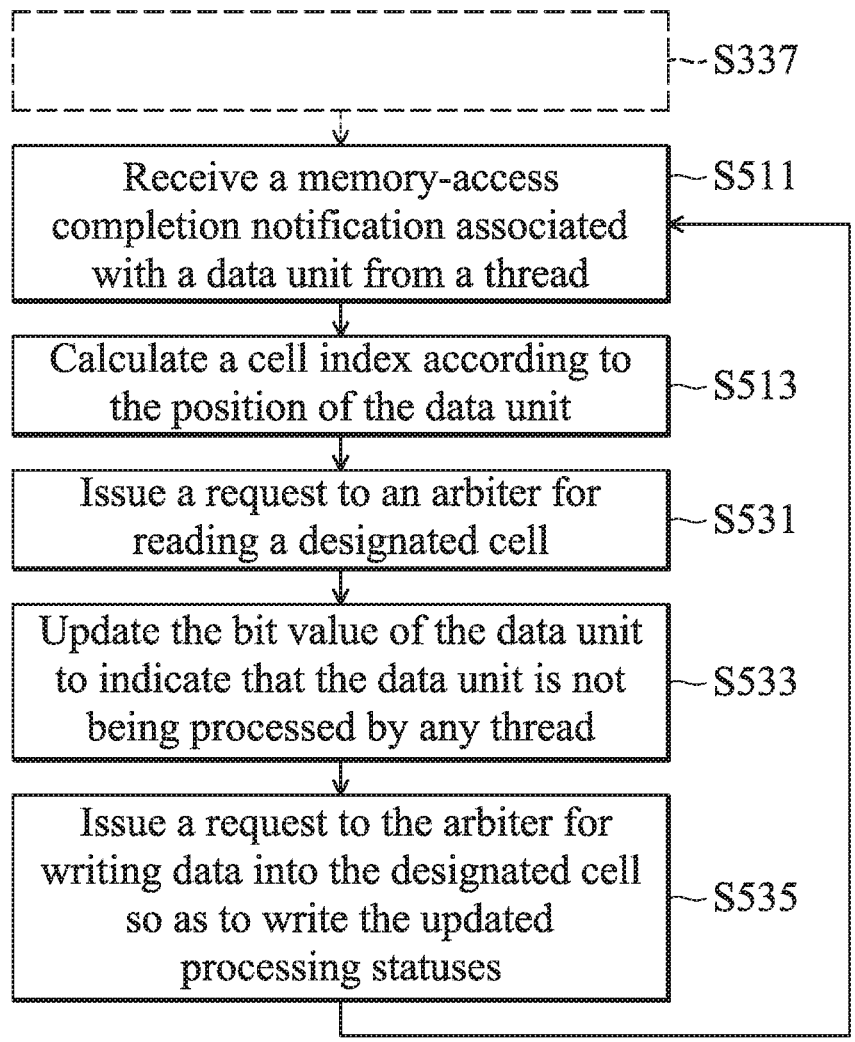
FIG. 5 is a flowchart illustrating a method for checking dependencies of data units, performed by a window releaser, according to an embodiment of the invention.

FIG. 5 is a flowchart illustrating a method for checking dependencies of data units, performed by the window releaser 150, according to an embodiment of the invention. The window releaser 150 begins with a reception of the memory-access completion notification associated with the data unit from a thread (step S511). The memory-access completion notification contains at least the position at which the data unit is situated in the 2D image. After calculating a cell index according to the position of the data unit (step S513), the window releaser 150 issues a request to an arbiter 140 for reading a designated cell (step S531), updates the bit value of the data unit to indicate that the data unit is not being processed by any thread (step S533), and issues a request to the arbiter 140 for writing data into the designated cell so as to write the updated processing statuses (step S535). The requests for reading data from and writing data into the designated cell, which are issued by the window releaser 150, contain the calculated cell index. It should be noted that the arbiter 140 may read the whole processing statuses of the cell at one time and reply with the processing statuses to the window releaser 150, and then, the window releaser 150 may update the processing status associated with the data unit according to the position of the data unit. Assume that, for example, cell 0 stores processing statuses of quads 0 to 255 and the data unit is the quad 7: The window releaser 150 may update the processing status of bit 7 according to the position of the data unit. In step S535, it should be noted that, except for the processing status associated with the data unit, the other processing statuses are maintained without any modification. To simplify the lock design of the arbiter 140, the read and write requests are executed pair by pair.

Figure 6:
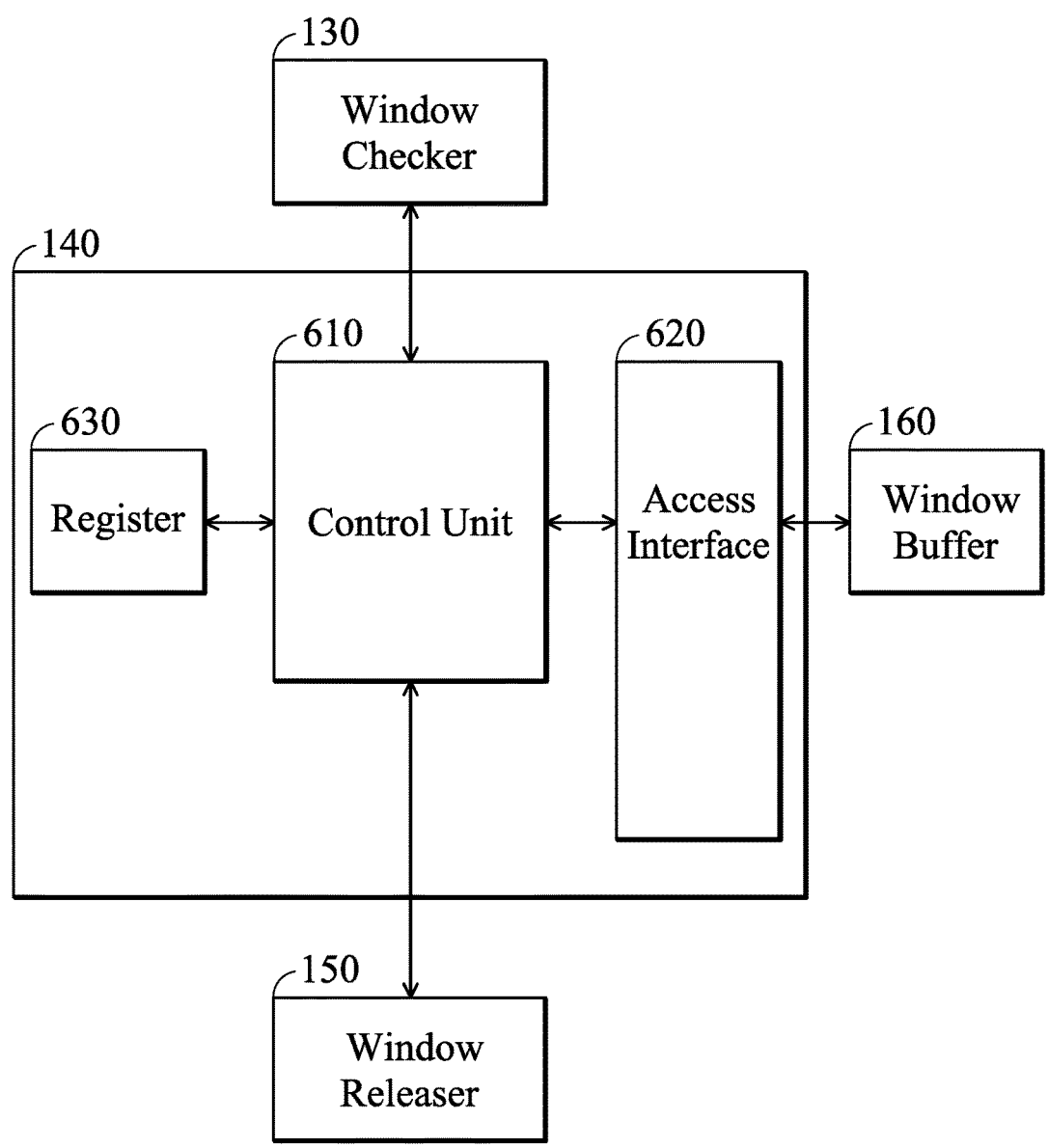
FIG. 6 is a block diagram of an arbiter according to an embodiment of the invention.

In order to coordinate the requests between the window checker 130 and the window releaser 150, the arbiter 140 grants one of the requests according to the following rules to avoid a read-after-write hazard in which a thread reads a data unit that has been processed by another thread but has yet to be written back. FIG. 6 is a block diagram of an arbiter according to an embodiment of the invention. A register 630 records a lock flag and a cell index of the window checker 130. The lock flag of the window checker 130 being "true" indicates that the window checker 130 has read the processing status of the designated cell (indicated by the cell index) of the window buffer 160 but hasn't written the (original or updated) processing status back yet. The lock flag of the window checker 130 being "false" indicates that the window checker 130 hasn't read new cell data from the window buffer 160 yet. The register 630 further records a lock flag and a cell index of the window releaser 150. The lock flag of the window releaser 150 being "true" indicates that the window releaser 150 has read the processing status of the designated cell (indicated by the cell index) of the window buffer 160 but hasn't written the (original or updated) processing status back yet. The lock flag of the window releaser 150 being "false" indicates that the window releaser 150 hasn't read new cell data from the window buffer 160 yet.

When receiving a request (which may be a read or write request) from the window checker 130, the control unit 610 stores a cell index of the request in the register 630. Similarly, when receiving a request (which may be a read or write request) from the window releaser 150, the control unit 610 stores a cell index of the request in the register 630. The control unit 610 reads the aforementioned lock flags and cell indices and employs the following rules to select and process one of the requests issued by the window checker 130 and the window releaser 150. In the first rule, when the lock flags of the window checker 130 and the window releaser 150 are "false" and the two cell indices are the same (indicating that the window checker 130 and the window releaser are asking to read processing statuses from the same cell), the control unit 610 selects and processes the read request issued by the window releaser 150. That is, when conflict occurs, the priority of the window releaser 150 is higher than that of the window checker 130 to avoid the aforementioned read-after-write hazard. Specifically, the control unit 610 directs an access interface 620 to read processing statuses from the designated cell, replies with the read data to the window releaser 150, and updates the lock flag of the window releaser 150 with "true". In the second rule, when the lock flag of the window checker 130 is "true" and the lock flag of the window releaser 150 is "false" and the two cell indices are different (indicating that the window checker 130 asks to write processing statuses into one cell and the window releaser 150 asks to read processing statuses from another cell), the control unit 610 selects and processes the read request issued by the window releaser 150. Specifically, the control unit 610 directs the access interface 620 to read processing statuses from the designated cell, replies with the read data to the window releaser 150 and updates the lock flag of the window releaser 150 with "true". In the third rule, when the lock flag of the window checker 130 is "false" and the lock flag of the window releaser 150 is "true" and the two cell indices are different (indicating that the window checker 130 asks to read processing statuses from one cell and the window releaser 150 asks to write processing statuses into another cell), the control unit 610 selects and processes the read request issued by the window checker 130. Specifically, the control unit 610 directs the access interface 620 to read processing statuses from the designated cell, replies with the read data to the window checker 130 and updates the lock flag of the window checker 130 with "true". In the fourth rule, when the lock flag of the window checker 130 is "true" and the lock flag of the window releaser 150 is "false" and the two cell indices are the same (indicating that the window checker 130 asks to write processing statuses into one cell and the window releaser 150 asks to read processing statuses from the same cell), the control unit 610 selects and processes the write request issued by the window checker 130 to ensure that the read and write requests issued by the window checker 130 can be processed consecutively and will not be interrupted by the read request issued by the window releaser 150. Specifically, the control unit 610 directs the access interface 620 to write processing statuses into the designated cell, replies with a data-write success message to the window checker 130 and updates the lock flag of the window checker 130 with "false". In the fifth rule, when the lock flag of the window checker 130 is "false" and the lock flag of the window releaser 150 is "true" and the two cell indices are the same (indicating that the window checker 130 asks to read processing statuses from one cell and the window releaser 150 asks to write processing statuses into the same cell), the control unit 610 selects and processes the write request issued by the window releaser 150 to ensure that the read and write requests issued by the window releaser 150 can be processed consecutively and will not be interrupted by the read request issued by the window checker 130. Specifically, the control unit 610 directs the access interface 620 to write processing statuses into the designated cell, replies with a data-write success message to the window releaser 150 and updates the lock flag of the window releaser 150 with "false". In the sixth rule, when the lock flags of the window checker 130 and the window releaser 150 are "true" and the two cell indices are different (indicating that the window checker 130 and the window releaser ask to write processing statuses into different cells), the control unit 610 selects and processes the write request issued by the window releaser 150. Specifically, the control unit 610 directs the access interface 620 to write processing statuses into the designated cell, replies with a data-write success message to the window releaser 150 and updates the lock flag of the window releaser 150 with "false".

It should be noted that, as for any of the second, third and sixth rules that have no conflict, the arbitration may prioritize the window checker 130. That is, the control unit 610 selects and processes the request issued by the window checker 130. Or, the arbitration may employ a round-robin principle to yield a more balanced throughput. For example, the control unit 610 selects and processes the request issued by the window checker 130 when the request issued by the window releaser 150 was selected last time, and vice versa.

In some implementations, the designer may devise the window buffer 160 with registers for storing the aforementioned processing statuses and install numerous comparators to achieve functions similar to those taught by the embodiments of the invention. However, the implementations consume at least three times the gate-count cost of the embodiments of the invention.

Although the embodiments have been described in FIGS. 1 and 6 as having specific elements, it should be noted that additional elements may be included to achieve better performance without departing from the spirit of the invention. While the process flows described in FIGS. 3 to 5 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for checking dependencies of a plurality of data units, comprising:
    a window buffer, comprising a plurality of cells, wherein each cell comprises a plurality of bits, wherein each bit indicates a processing status associated with one of the plurality of data units;
    a window checker, coupled to the window buffer, for receiving a memory-access request associated with a first data unit from a first thread, issuing a read request for reading a first cell containing the processing status associated with the first data unit, and issuing a write request for writing into the first cell to write the processing status associated with the first data unit, wherein the first thread reads attribute values associated with the first data unit from a memory when receiving an acknowledgement from the window checker indicating that the first data unit is not being processed by another thread; and
    a window releaser, coupled to the window buffer, for receiving a memory-access completion notification associated with a second data unit from a second thread, issuing a read request for reading a second cell containing the processing status associated with the second data unit, and issuing a write request for writing into the second cell to update the processing status associated with the second data unit to indicate that the second data unit is not being processed by any thread.

2. The apparatus of claim 1, further comprising:
    an arbiter, coupled to the window buffer, for coordinating the read requests and the write requests from the window checker and the window releaser, reading the processing statuses from the plurality of cells to reply to the window checker or the window releaser, and writing the processing statuses into the plurality of cells and replying write-success messages to the window checker or the window releaser.

3. The apparatus of claim 2, wherein when the window checker issues the read request for reading the first cell and the window releaser issues the read request for reading the second cell, and the first cell and the second cell are the same cell, the arbiter processes the read request issued by the window releaser.

4. The apparatus of claim 2, wherein when the window checker issues the write request for writing into the first cell and the window releaser issues the read request for reading the second cell, and the first cell and the second cell are the same cell, the arbiter processes the write request issued by the window checker.

5. The apparatus of claim 2, wherein when the window checker issues the read request for reading the first cell and the window releaser issues the write request for writing into the second cell, and the first cell and the second cell are the same cell, the arbiter processes the write request issued by the window releaser.

6. The apparatus of claim 2, wherein when the first cell and the second cell are different cells, the arbiter processes the read request or the write request issued by the window checker when the read request or the write request issued by the window releaser was processed last time, and processes the read request or the write request issued by the window releaser when the read request or the write request issued by the window checker was processed last time.

7. The apparatus of claim 1, wherein when the first data unit is being processed by another thread, the window checker issues the write request for writing into the first cell to write the processing status associated with the first data unit previously read by the read request issued by the window checker,
    wherein when the window releaser issues the write request for writing into the second cell to update the processing status associated with the second data unit, the processing statuses associated with the plurality of data units other than the second data unit are not modified in the second cell.

8. The apparatus of claim 1, wherein the window checker issues the read request for reading the first cell and the write request for writing into the first cell in pairs, and the window releaser issues the read request for reading the second cell and the write request for writing into the second cell in pairs.

9. A method for checking dependencies of a plurality of data units by a window checker and a window releaser, wherein the window checker and the window releaser are coupled to a window buffer comprising a plurality of cells, wherein each cell comprises a plurality of bits, wherein each bit indicates a processing status associated with one of the plurality of data units, the method comprising:

receiving, by the window checker, a memory-access request associated with a first data unit from a first thread;

issuing, by the window checker, a read request for reading a first cell containing the processing status associated with the first data unit;

issuing, by the window checker, a write request for writing into the first cell to write the processing status associated with the first data unit;

receiving, by the window releaser, a memory-access completion notification associated with a second data unit from a second thread;

issuing, by the window releaser, a read request for reading a second cell containing the processing status associated with the second data unit; and issuing, by the window releaser, a write request for writing into the second cell to update the processing status associated with the second data unit to indicate that the second data unit is not being processed by any thread, wherein the first thread reads attribute values associated with the first data unit from a memory when receiving an acknowledgement from the window checker indicating that the first data unit is not being processed by another thread.

10. The method of claim 9, wherein the window buffer is further coupled to an arbiter for coordinating the read requests and the write requests from the window checker and the window releaser, reading the processing statuses from the plurality of cells to reply to the window checker or the window releaser, and writing the processing statuses into the plurality of cells and replying write-success messages to the window checker or the window releaser.

11. The method of claim 10, wherein when the window checker issues the read request for reading the first cell and the window releaser issues the read request for reading the second cell, and the first cell and the second cell are the same cell, the arbiter processes the read request issued by the window releaser.

12. The method of claim 10, wherein when the window checker issues the write request for writing into the first cell and the window releaser issues the read request for reading the second cell, and the first cell and the second cell are the same cell, the arbiter processes the write request issued by the window checker.

13. The method of claim 10, wherein when the window checker issues the read request for reading the first cell and the window releaser issues the write request for writing into the second cell, and the first cell and the second cell are the same cell, the arbiter processes the write request issued by the window releaser.

14. The method of claim 10, wherein when the first cell and the second cell are different cells, the arbiter processes the read request or the write request issued by the window checker when the read request or the write request issued by the window releaser was processed last time, and processes the read request or the write request issued by the window releaser when the read request or the write request issued by the window checker was processed last time.

15. The method of claim 9, wherein when the first data unit is being processed by another thread, the window checker issues the write request for writing into the first cell to write the processing status associated with the first data unit previously read by the read request issued by the window checker, wherein when the window releaser issues the write request for writing into the second cell to update the processing status associated with the second data unit, the processing statuses associated with the plurality of data units other than the second data unit are not modified in the second cell.

16. The method of claim 9, wherein the window checker issues the read request for reading the first cell and the write request for writing into the first cell in pairs, and the window releaser issues the read request for reading the second cell and the write request for writing into the second cell in pairs.

* * * * *